W. H. SHANKLAND.
PNEUMATIC SUSPENSION FOR VEHICLES.
APPLICATION FILED JUNE 7, 1910.
982,190.
Patented Jan. 17, 1911.
2 SHEETS—SHEET 2.
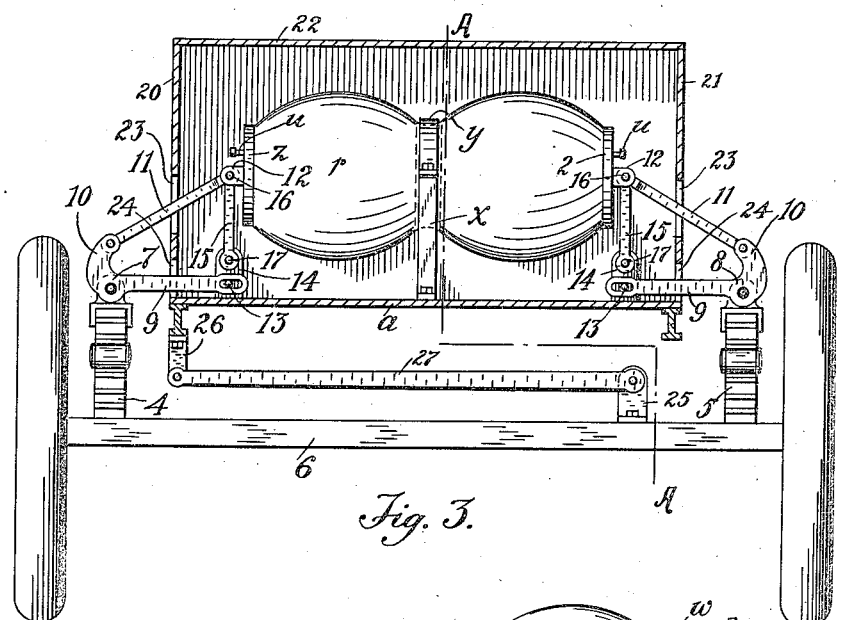
Fig. 3.
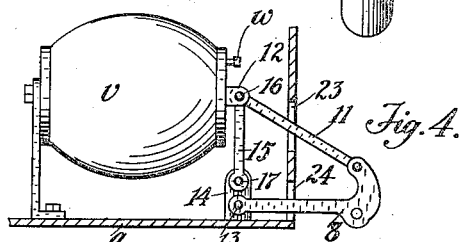
Fig. 4.
Fig. 6.
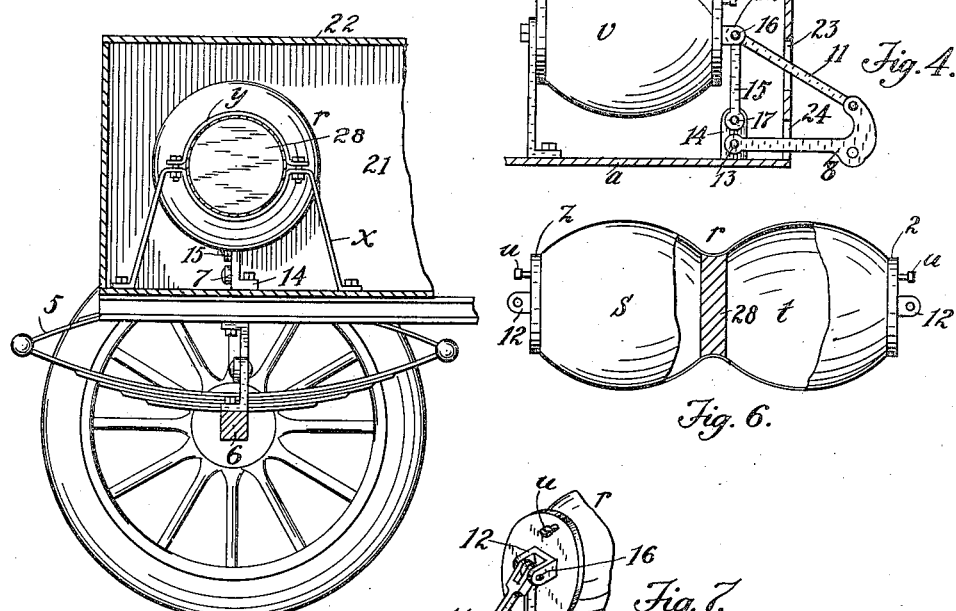
Fig. 5.
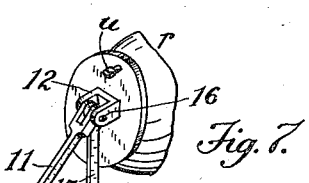
Fig. 7.
WITNESSES:
Carlyle Geisler
OO Martin
INVENTOR
William H. Shankland
BY
Geisler
ATTORNEY

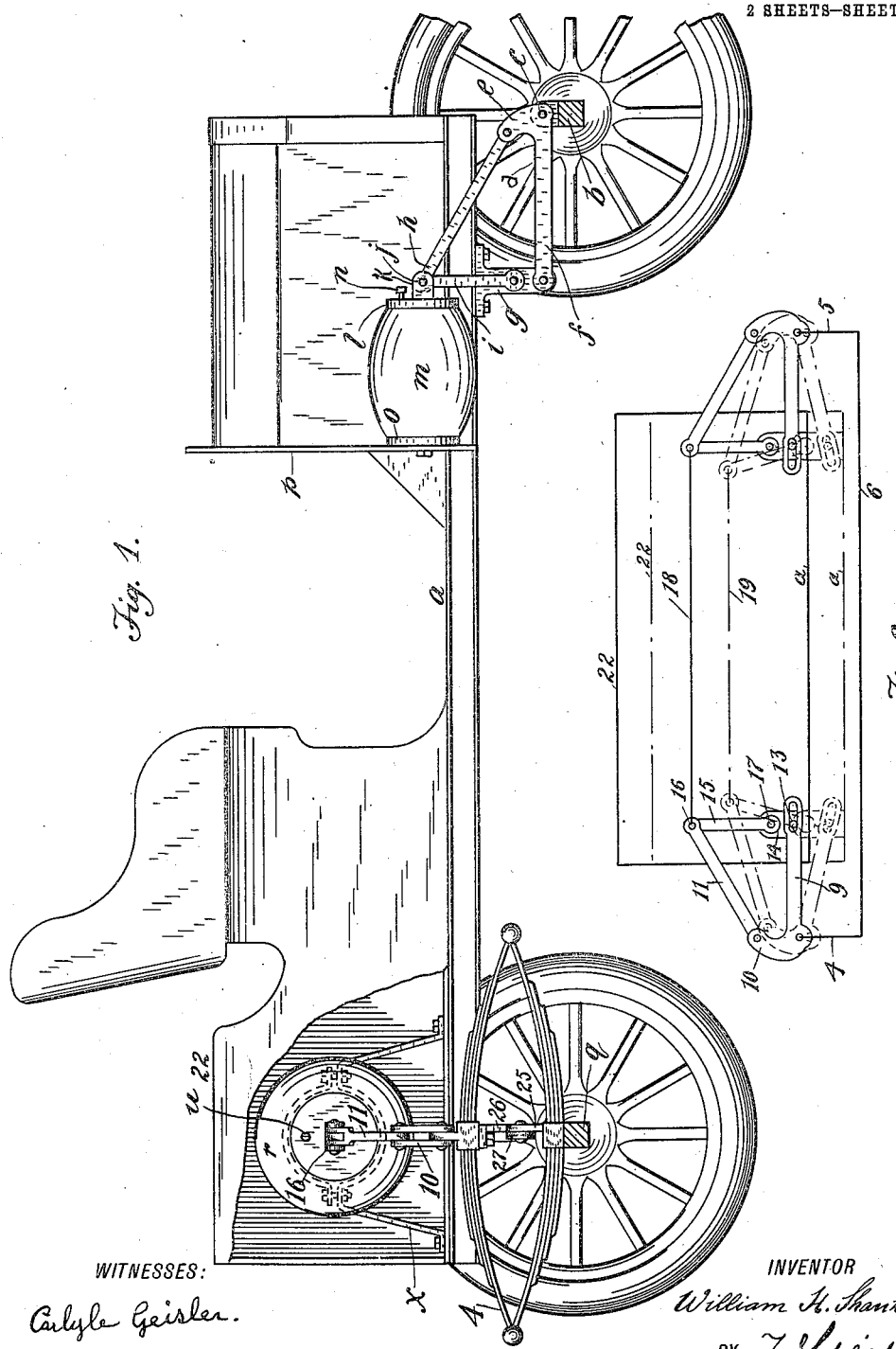

UNITED STATES PATENT OFFICE.

WILLIAM H. SHANKLAND, OF ST. JOHNS, OREGON.

PNEUMATIC SUSPENSION FOR VEHICLES.

982,190.

Specification of Letters Patent.  Patented Jan. 17, 1911.

Application filed June 7, 1910. Serial No. 565,621.

*To all whom it may concern:*

Be it known that I, WILLIAM H. SHANKLAND, a citizen of the United States, and a resident of St. Johns, in the county of Multnomah and State of Oregon, have invented a new and useful Improvement in Pneumatic Suspension for Vehicles, of which the following is a specification.

This invention has for its object to obtain a springy and easy riding vehicle without the employment of pneumatic tires on the wheel; and to this end my invention in its general sense consists in introducing pneumatic cushions between the wheel axles and the vehicle body, or the springs of the latter, if supporting-springs be used.

The details of the arrangement and construction of my invention are more readily understood by having reference to the drawings, in which:

Figure 1 is a side elevation of a vehicle, of the automobile type, with my invention applied for suspending the vehicle body on the running gear as in practice; Fig. 2 is a diagrammatic cross-section along the hind axle of the vehicle shown in Fig. 1, and illustrates the operation of my pneumatic suspending means; Fig. 3 is a cross-section along the hind axle of my vehicle, also illustrating the operation of my pneumatic suspending means; Fig. 4 is a partial cross-section similar to Fig. 3, but illustrates a modification of the arrangement of the pneumatic suspending means; Fig. 5 is a longitudinal section on the line A—A of Fig. 3 of the rear portion of the vehicle; Fig. 6 is a detail of the pneumatic cushion shown in Fig. 3; and Fig. 7 is a perspective detail illustrating the arrangement of the angular lever, the oblique link pivoting and the vertical post constituting a part of the devices used in suspending the vehicle body from the cushion as shown in preceding views.

The vehicle body, *a*, represents, as mentioned, a type of the automobile class. On the ends of the front axle, *b*, are fulcrumed the apexes *c* of angular levers *d*, having a short arm *e* and a long arm *f*. The long arm *f* is pivotally connected to a hanger *g* affixed to the bottom of the vehicle body, *a*, and the short arm *e* is connected by a link *h* with the upper end of a vertical supporting post *i;* and said link and post *i* are respectively connected at their point of juncture, *j*, to the ears *k*, projecting from the head *l* of the inflated cushion *m*. The suspending means on the opposite side of the vehicle are a duplicate of the near side shown in Fig. 1, and just described.

The head *l* of the inflated cushion *m* is provided with an inflation valve *n*, as common in the construction of the kind described, and the opposite head *o* is connected to a projecting wall-portion *p* of the motor-housing, on the front end of the vehicle. The arrangement of the means for suspending the vehicle on the hind axle *q* is somewhat different. Such arrangement consists of an inflated cushion *r*, preferably comprising two chambers *s*, *t*, each provided with an inflation valve *u*, and said chambers separated by a wall 28; or, in place of said inflated cushion *r* may be used a cushion composed of two units like *v*, as illustrated in Fig. 4, each of said units being also provided with the usual inflation valve *w*. The particular arrangement of the inflated cushion, *r*, is, however, immaterial. The inflated cushion *r* is supported at its center by standards *x* and secured in place by a strap *y*. The lateral ends of the cushion *r* are provided with heads *z*, 2, having, respectively, inflation valves *u* of the usual construction, as mentioned.

The springs 4, 5, although represented in the form of vehicle springs, may, nevertheless, be mere dummies, given the form of the usual wagon springs merely for appearance. Said springs are mounted on the ends of the hind axle 6. On the springs 4, 5, are fulcrumed the apexes of the levers 7, 8, each provided with long arms 9 and short arms 10. The short arms 10 are connected by oblique links 11 with the projecting ears 12 on the heads *z*, 2 of the inflated cushion *r*.

In the construction shown in Fig. 2, the outer ends of the long arms 9 of the angular levers are slotted, to accommodate movement, and said ends are connected by means of pins 13 to lugs 14, rigidly mounted on the floor of the vehicle body; and vertical posts 15 are pivotally fastened at their lower ends to the lugs 14, and at their upper ends to the ears 12; and it is to be noted that the pivot points 16, 17 and the pin 13 are all normally located in the same vertical plane.

In the construction last described, when a weight is imposed upon the vehicle body, the inflated cushion *r* is compressed lengthwise, and the suspending means operated as diagrammatically illustrated in Fig. 2, in which the solid line 18 and the dash and dot line 19 represent the normal and the compressed lengths of the inflated cushion r; the other parts being designated by reference characters agreeing with those applied to similar parts in Fig. 3.

The angular lever 8, the oblique link 11, the pivotal post 15, and the connections of the parts illustrated in Fig. 4 are substantially a duplicate of those illustrated in Fig. 3, and such parts have therefore been designated by the same reference characters. Nevertheless there is this difference: The construction illustrated in Fig. 4 is designed for cases where elastic wagon springs 5 are used. Under such circumstances it is not necessary that the ends of the long arm of the angular lever 8 be slotted in order to accommodate the movements of the parts under a load, for such movement is accommodated by the bending inward of the elastic springs. The side walls 20, 21 of the seat-box 22 are provided with slots 23, 23, 24, 24, to accommodate the movement of the projecting parts of the suspending devices as shown. On one end of the hind axle 6 is mounted a lug 25, and on the opposite end of the seat-box 22 is provided a rigid hanger 26 and a connecting link, 27, restrains the vehicle body against excessive lateral swing.

From the description above given it will now be clear that while it is not objectionable that the supporting members 4, 5 be resilient springs, yet as a matter of fact rigid supports will answer equally well, since the springiness of the vehicle body is obtained by the pneumatic suspension means independent of the customary wagon springs.

I claim:

1. In a vehicle, the combination with the running gear and the body, of means suspending the latter on the former and comprising an inflated cushion affixed on the vehicle body and adapted to be compressed; perpendicular lugs on the vehicle body; bell-crank levers comprising long and short members, said levers fulcrumed at their apexes on the axle ends, the ends of their long members pivoted to said lugs on the vehicle body; ears on the cushion; oblique links connecting the short members of said bell-crank levers with said ears of the cushion, and perpendicular posts hinged at one end to said ears and at the other end to said lugs on the vehicle body, the parts being so arranged that the axes of the hinge connections of said posts of the outer ends of the long members of the bell-cranks and of the outer ends of said oblique links all lie, normally, in the same perpendicular plane.

2. In a vehicle, the combination with the running gear and the body, of means suspending the latter on the former and comprising an inflated cushion affixed on the vehicle body and adapted to be compressed longitudinally; perpendicular lugs on the vehicle body; bell-crank levers comprising long and short members, said levers fulcrumed at their apexes on the axle ends, the ends of their long members pivoted to said lugs on the vehicle body; ears on the cushion; oblique links connecting the short members of said bell-crank levers with said ears of the cushion, and perpendicular posts hinged at one end to said ears and at the other end to said lugs on the vehicle body, the parts being so arranged that the axes of the hinge connections of said posts of the outer ends of the long members of the bell-cranks and of the outer ends of said oblique links all lie, normally, in the same perpendicular plane.

3. In a vehicle, the combination with the running gear and the body, of means suspending the latter on the former and comprising an inflated cushion affixed on the vehicle body and adapted to be compressed; perpendicular lugs on the vehicle body; bell-crank levers comprising long and short members, said levers fulcrumed at their apexes on the axle ends, the ends of their long members pivoted to said lugs on the vehicle body; oblique links connecting the short members of said bell-crank levers with the outer ends of said cushion, and perpendicular posts hinged at one end to the cushion and at the other end to said lugs on the vehicle body, the parts being so arranged that the axes of the hinge connections of said posts, of the outer ends of the long members of the bell-cranks and of the outer ends of said oblique links all lie, normally, in the same perpendicular plane.

WILLIAM H. SHANKLAND.

Witnesses:
RALPH R. DUNIWAY,
C. B. LONG.